United States Patent
Alvarez

(10) Patent No.: US 6,345,099 B1
(45) Date of Patent: *Feb. 5, 2002

(54) SYSTEM AND METHOD FOR COPY PROTECTING COMPUTER GRAPHICS

(75) Inventor: José R. Alvarez, Sunnyvale, CA (US)

(73) Assignee: S3 Incorporated, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,623

(22) Filed: May 22, 1998

(51) Int. Cl.[7] .............................................. H04N 7/167
(52) U.S. Cl. ........................ 380/203; 380/201; 380/204
(58) Field of Search ................................ 380/201, 203, 380/204

(56) References Cited

U.S. PATENT DOCUMENTS

| | | | | |
|---|---|---|---|---|
| 3,586,776 A | * | 6/1971 | Salava | 375/368 |
| 4,535,357 A | * | 8/1985 | Penney | 348/523 |
| 5,134,496 A | * | 7/1992 | Schwab et al. | 386/94 |
| 5,243,411 A | * | 9/1993 | Shirochi et al. | 348/473 |
| 5,251,041 A | * | 10/1993 | Young et al. | 386/44 |
| 5,260,969 A | * | 11/1993 | Kato et al. | 375/1 |
| 5,394,470 A | * | 2/1995 | Buynak et al. | 380/5 |
| 5,481,608 A | * | 1/1996 | Wijnen | 380/5 |
| 5,583,936 A | | 12/1996 | Wonfor et al. | 380/15 |
| 5,608,799 A | * | 3/1997 | Ryan et al. | 380/11 |
| 5,625,691 A | | 4/1997 | Quan | 380/15 |
| 5,680,454 A | * | 10/1997 | Mead | 380/14 |
| 5,761,302 A | * | 6/1998 | Park | 380/5 |
| 5,784,523 A | * | 7/1998 | Quan et al. | 386/94 |
| 5,953,417 A | * | 9/1999 | Quan | 380/5 |
| 5,978,480 A | * | 11/1999 | Fong et al. | 380/15 |
| 5,990,965 A | * | 11/1999 | Herz et al. | 348/446 |
| 6,035,177 A | * | 3/2000 | Moses et al. | |
| 6,041,158 A | * | 3/2000 | Sato | 380/5 |
| 6,195,129 B1 | * | 2/2001 | Ogino et al. | 348/469 |

* cited by examiner

*Primary Examiner*—Tod Swann
*Assistant Examiner*—Douglas J. Meislahn
(74) *Attorney, Agent, or Firm*—Carr & Ferrell LLP

(57) ABSTRACT

Copy protection is provided for the now-unprotected computer monitor port of a computer 100 in two ways: (i) delaying synchronizing signals by a time variable amount and (ii) generating pulses during non-active video. Delay of the synchronizing signal is performed by selecting a fixed offset 203 and selecting either the fixed offset of the pseudorandom delay to be sent to a variable delay generator 260, which delays the horizontal synchronizing signal 201 by the selected amount. This new delayed horizontal synchronizing signal 202 is encoded by the CRT Controller 244 and is then sent to the computer monitor 164, which uses the delayed synchronizing signal 202 as encoded to produce its display in conjunction with a data signal. Thus, if these signals 202, 268 are intercepted by a VGA to TV converter 122, the converter 122 (or any downstream device) is unable to lock onto the correct frequency in order to reproduce the image properly. Horizontal pulse bars 218 may also be generated to render a signal unfit for taping purposes. The horizontal pulse bars 218 are generated to replace the portion of the video signal containing no picture information after vertical picture contraction has occurred. The amplitude of the input signal 212 is reduced, and the amplitude of the pulse bars 218 is increased to be greater than the amplitude of the input signal 212. The horizontal pulse bars 218 are then combined with the attenuated signal 214. When a VHS recorder 116 detects the amplitude of the modified signal, it lowers the amount of gain added to the signal because of the high amplitude of the added pulses. As the data content of the signal is at a much lower amplitude than the added pulses due to the attenuation, the viewable picture after taping is extremely dim and of poor quality.

20 Claims, 8 Drawing Sheets

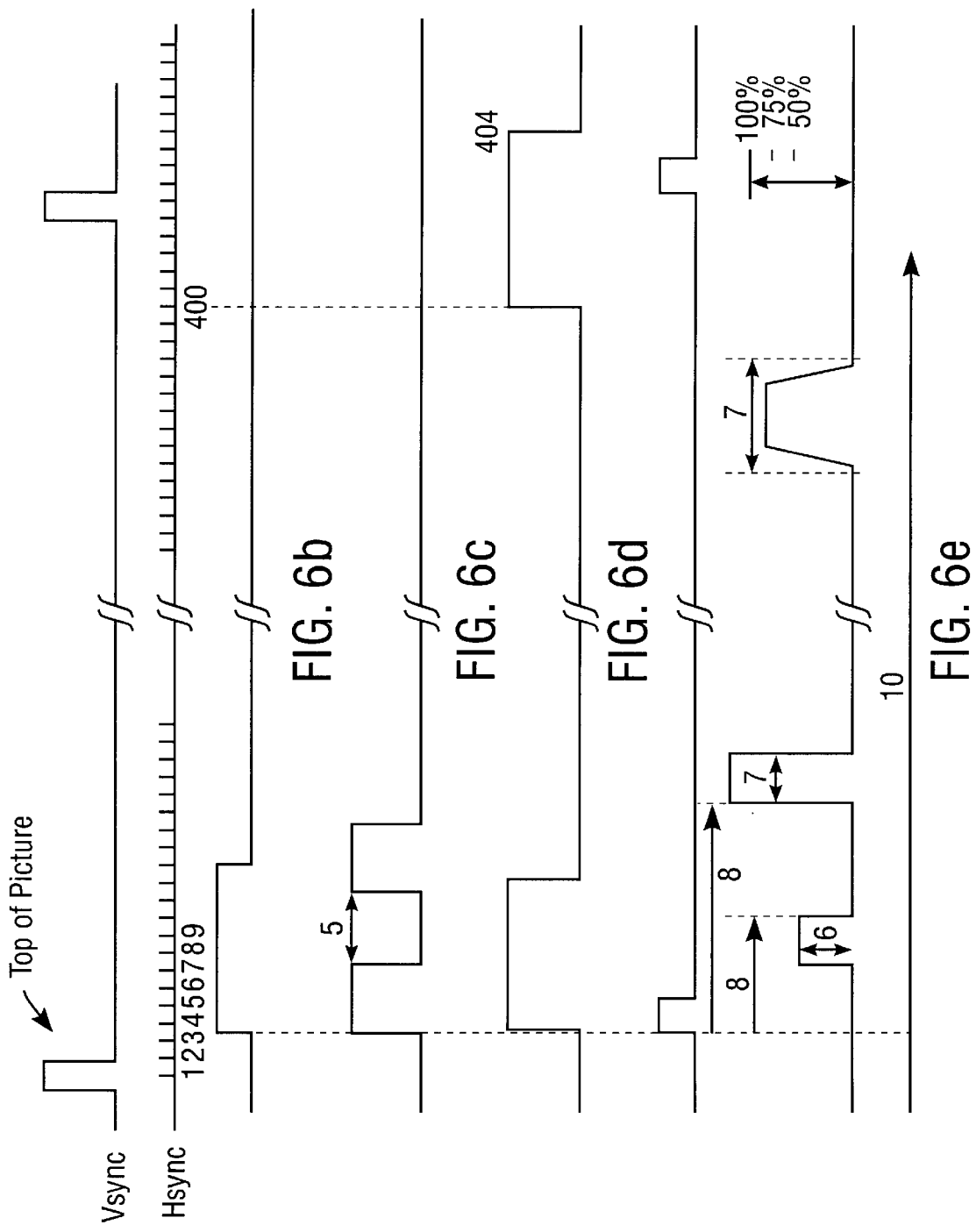

SYSTEM AND METHOD FOR COPY PROTECTING COMPUTER GRAPHICS

BACKGROUND OF THE INVENTION

1. Field of the Invention

This invention relates generally to computer/television video systems, and specifically to providing copy protection to computer video signals.

2. Description of the Related Art

The advent of Digital Video Disc (DVD) players has created excitement in the entertainment and consumer electronics industry. DVD offers clearer pictures, clearer audio, and more capabilities than most other video playback devices. In addition to use as a playback mechanism in connection with television, DVD players can also be coupled to a personal computer (PC) as a Read-Only type data storage device in the form of a DVD-ROM (Read Only Memory). With a DVD player installed in a computer, the computer can play high-quality video on the computer monitor. Typically, conventional computers allow any data that is accessed by the computer to be copied to another location. Thus copyrighted audiovisual material stored on aa DVD-ROM such as movies, songs, shows, etc., may be freely copied on a PC equipped with a DVD-ROM player. As can be seen, with this advancement in technology provided by DVD comes a price: the possibility of pirated copies of copyrighted material.

Currently, copyrighted material played on conventional analog VHS recorders may be protected from pirated copying by technology available from the Macrovision Corporation. VHS recorders typically employ an Automatic Gain Control (AGC) circuit to apply gain to boost an incoming signal's level to a level for acceptable viewing. The VHS recorder determines the amount of gain to add by finding the maximum picture amplitude of the incoming signal. The maximum picture amplitude is then used as a baseline to determine how much gain the signal needs. The Macrovision technology uses electronic pulses to fool the VHS recorder into believing that picture information is of different characteristics from the real image content.

A DVD player coupled to a PC presents a different problem. Many PCs are now capable of converting a digitally encoded signal into an analog television signal for transmission to a television or a VHS recorder thereby making it possible to make a VHS tape recording of a DVD movie played by a computer's DVD player. Typically, such PCs encode a DVD signal for a standard television format, such as NTSC. A VHS recorder can be coupled to a port on the PC which provides an analog television format (e.g. NTSC) signal. Ordinarily, this would allow easy copying (legal or illegal) of the contents of a DVD type disc. However, the Macrovision process described above is now typically added to the signal being transmitted to the television, thus providing the same effective protection as described above.

The addition of the Macrovision process to PCs does not, however, eliminate another easily accessible means of copying. PCs which have a port for TV type signals typically also have a port (monitor port) to which a conventional computer monitor can be coupled. The monitor port typically is used to transmit an image which is the same or similar (but formatted differently) to that transmitted via the TV port. A would-be pirate can copy the DVD signal directly from the PC's VGA port by using a conventional VGA-to-TV (NTSC or PAL) converter. The Macrovision process cannot be added to the RGB signal prior to reaching the VGA port because the pseudo sync pulses would impair the computer monitor's ability to display RGB signals.

The other problem with current copyright protection schemes are their ability to be easily defeated by simple reverse engineering. Thus, there is a need for a copyright protection mechanism that produces a signal that can be accurately displayed on a computer monitor, but at the same time be of extremely poor image quality if converted to a television-compatible signal and copied using a VHS-type recorder. There is also a need for such a mechanism that is not easily defeated by reverse-engineering.

SUMMARY OF THE INVENTION

In a principal aspect the present invention provides copyright protection for the now-unprotected computer monitor port of a computer. Embodiments employing the principles of the present invention accomplish this goal in two ways: (i) delaying the synchronizing signals by a time variable amount and (ii) pulse generation during non-active video. Although either method alone may deter illicit copying, together the two systems advantageously produce a signal that is of sufficiently low picture quality to deter illicit copying and 'brand'the image as an image that was intended to be protected.

In accordance with the present invention, in certain embodiments a horizontal synchronizing signal sent to the monitor is delayed or advanced in time. In this embodiment, a fixed offset, or delay, is selected. In addition, a pseudo-random delay is introduced in conjunction with the fixed offset. Either the pseudorandom delay or the fixed delay is sent to a variable delay generator, which delays the horizontal synchronizing signal by the amount of the delay factor. The delayed horizontal synchronizing signal is then sent to the computer monitor, which uses the delayed synchronizing signal to produce its display in conjunction with data signals. Thus, if the data signal or the synchronizing signals are intercepted by a VGA to TV converter, that converter (or any downstream device) is unable to lock onto the correct frequency in order to reproduce the image properly.

Another embodiment of the present invention causes the generation of pulse bars that also renders a signal unfit for taping purposes. In accordance with this embodiment of the invention, horizontal pulse bars are generated to replace the portion of the video signal containing no picture information after vertical picture contraction has occurred. The amplitude of the input signal 212 is reduced, and the amplitude of the horizontal pulse bars is increased to be greater than the amplitude of the input signal. The horizontal pulse bars are then combined with the attenuated signal. When a VHS recorder detects the amplitude of the modified signal, it lowers the amount of gain that it adds to the modified signal because of the high amplitude of the added pulses. As the data content of the signal is at a much lower amplitude than the added pulses due to the attenuation, the viewable picture after taping is extremely dim and of poor quality. The pulse characteristics may be varied depending on user preferences by way of programmable registers.

As a computer monitor is designed to read quickly and follow horizontal synchronizing signal disturbances, the modifications to the signal above would have no detrimental effect when the signal is displayed on a computer monitor. Additionally, attenuating the amplitude of the input signal has no effect on the display of the signal due to the gamma characteristics of the computer monitor. These and other features and advantages may be better understood with reference to following specification.

BRIEF DESCRIPTION OF THE DRAWINGS

FIG. 5b is a block diagram showing further details of variable delay generator 260 illustrated in FIG. 5a.

FIG. 6b is a graph showing pulse bars 218 generated in accordance with a first embodiment.

FIG. 6c is a graph showing pulse bars 218 generated in accordance with a second embodiment.

FIG. 6d is a graph showing pulse bars 218 generated in accordance with a third embodiment.

FIG. 6e is a graph showing pulse bars 218 generated in accordance with a fourth embodiment.

DETAILED DESCRIPTION OF THE PREFERRED EMBODIMENTS

Figure 1A:
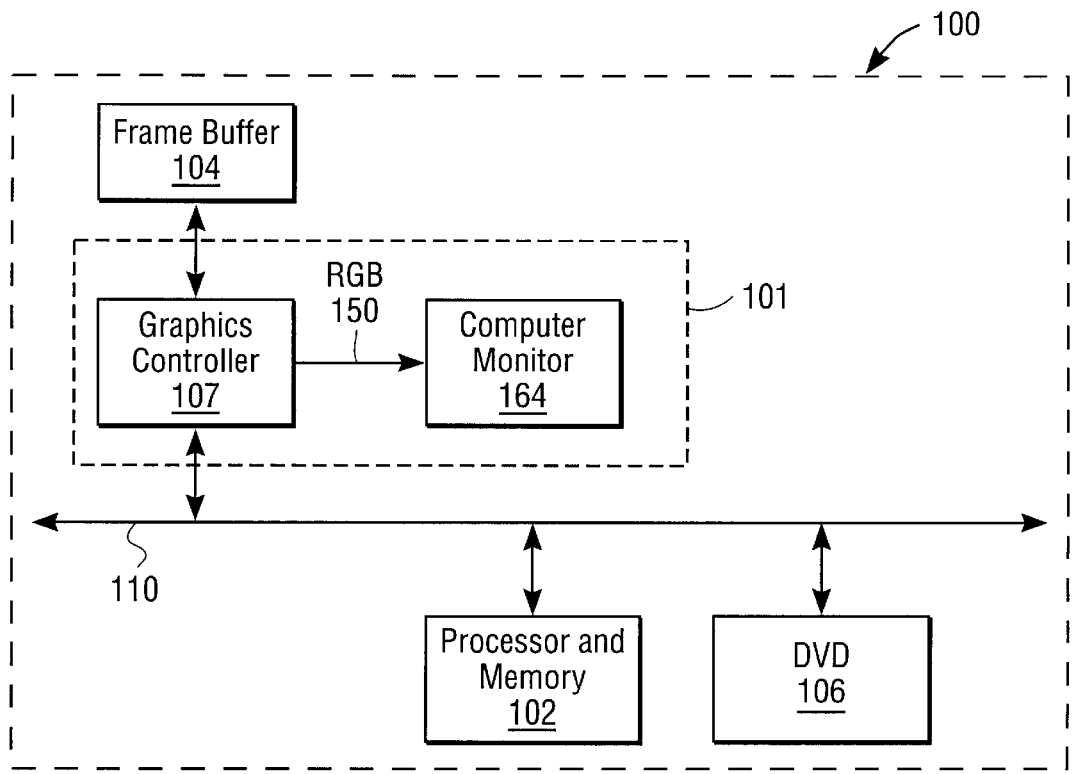
FIG. 1a is a block diagram of a prior art computer system 100.
Figure 1B:
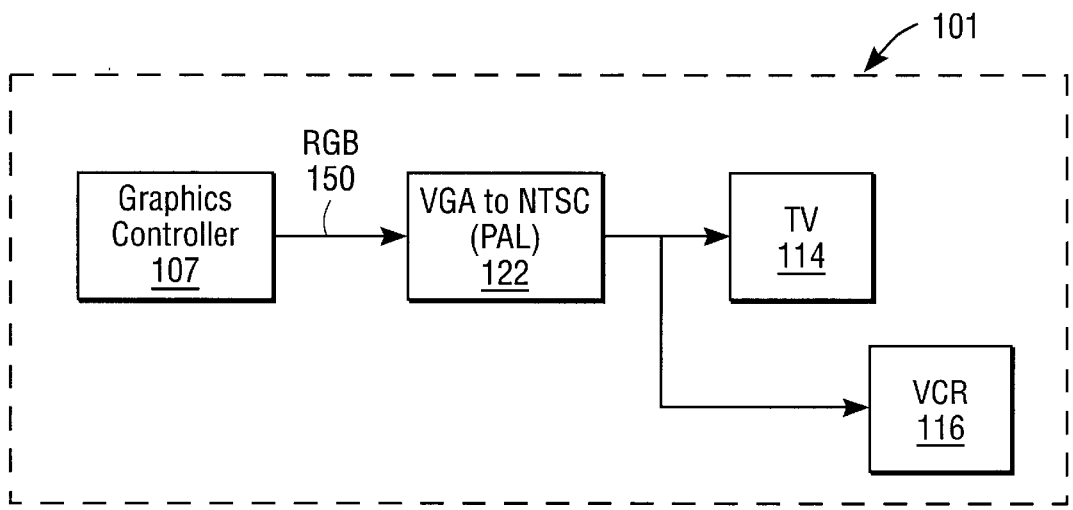
FIG. 1b is a block diagram illustrating by way of an example, a system that may be used to perform copying of signals from a graphics controller to a television.

FIG. 1a is a diagram of a prior art computer system 100. The computer system 100 includes a processor and associated memory subsystem 102, a bus 110, a DVD player 106, a graphics controller 107 with an associated frame buffer 104, and a computer type monitor 164. The system depicted in FIG. 1 a is one in which RGB signals output from the graphics controller 107 are transmitted for display to the computer monitor 164. The RGB signal output from the graphics controller 107 may have other copy protection schemes such as those available from Macrovision Corp. In FIG. 1b, a system 100 is shown in which a VGA to NTSC or PAL converter 122 is inserted in the signal path between the graphics controller 108 and the computer monitor 164. The converter 122 converts the analog RGB signal output by the controller 108 into a signal compatible with the television 114 and the VCR 116.

Figure 2:
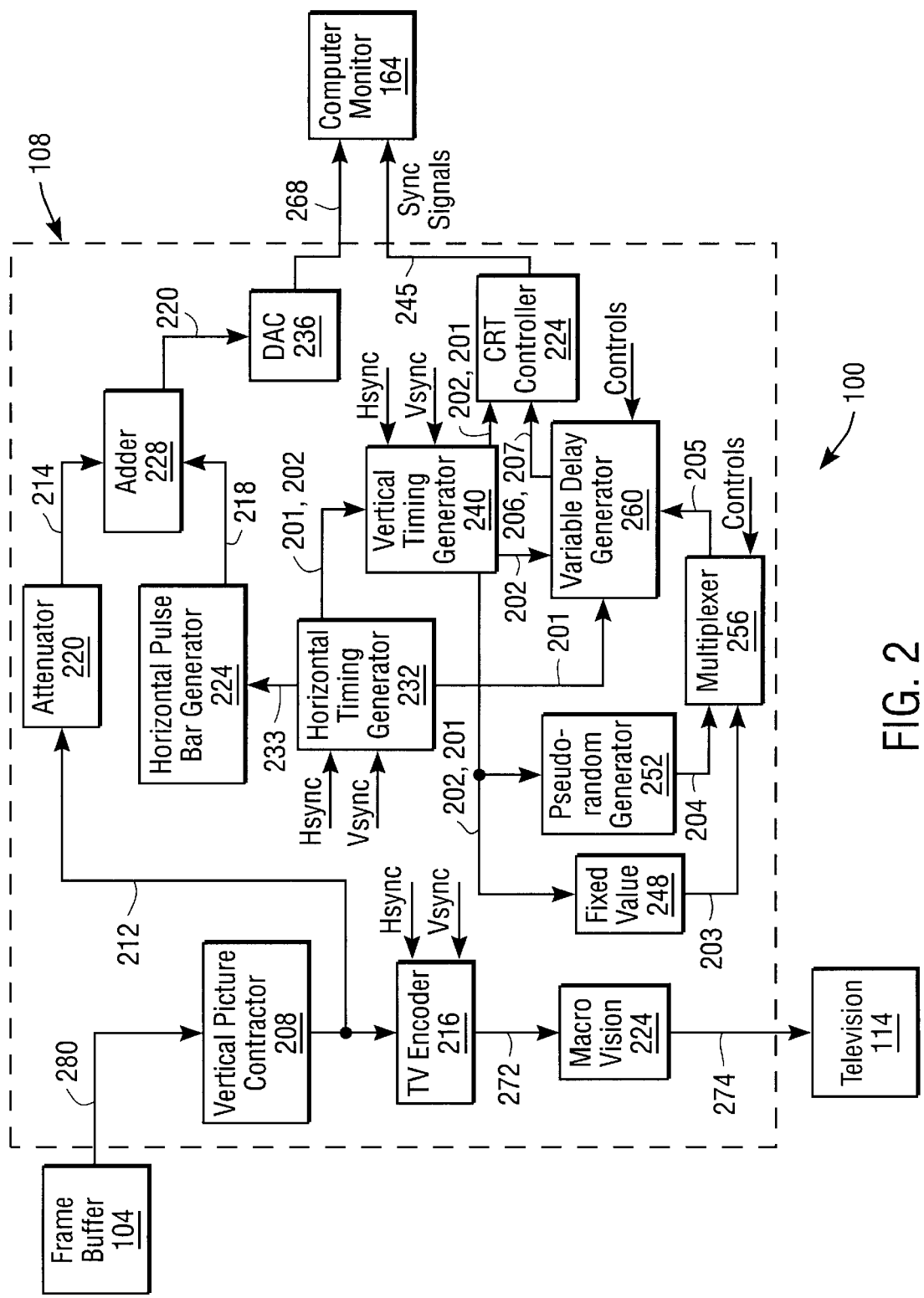
FIG. 2 is a block diagram illustrating a preferred embodiment of the present invention.

FIG. 2 illustrates a computer system 100 with a graphics controller 108 designed in accordance with the present invention for computer system 100. The graphics controller 108 advantageously operates to cause signals transmitted to the computer monitor 164 (hereinafter such signals are referred to as "computer monitor signals") to be of a type which allows accurate display by the monitor 164 of the computer monitor signals, while causing such signals to appear distorted if converted to a television-type analog signal such as NTSC or PAL and recorded by a VHS-type video recorder 116 as shown in FIG. 1b.

Graphics controller 108 receives pixel information in the form of a signal from a video source (such as DVD player 106). The pixel information is stored in a frame buffer 104. The pixel information is retrieved from frame buffer 104 and provided to a vertical picture contractor 208. One output of the vertical picture contractor 208 is coupled to a television encoder 216, which converts the pixel information to a television compatible format signal 272 (such as NTSC or PAL). The signal 272 is transmitted to cause display of an image on a conventional television 114. Again, the Macrovision process must be added by the Macrovision circuit 224 here to provide anti-copying protection for the PAL or NTSC 274 signal as required by the DVD consortium. In a preferred embodiment, the elements shown within graphics controller 108 are contained with a single integrated circuit which provides isolation of all of the signals and therefore additional protection from tampering. The second output 212 from the vertical picture contractor 208 is processed in a manner described below, to generate an RGB (Red, Green, Blue) signal 268 together with associated horizontal and vertical synchronizing signals, for display on a conventional computer monitor 164.

Synchronizing Signal Delay and Jitter

Figure 3:
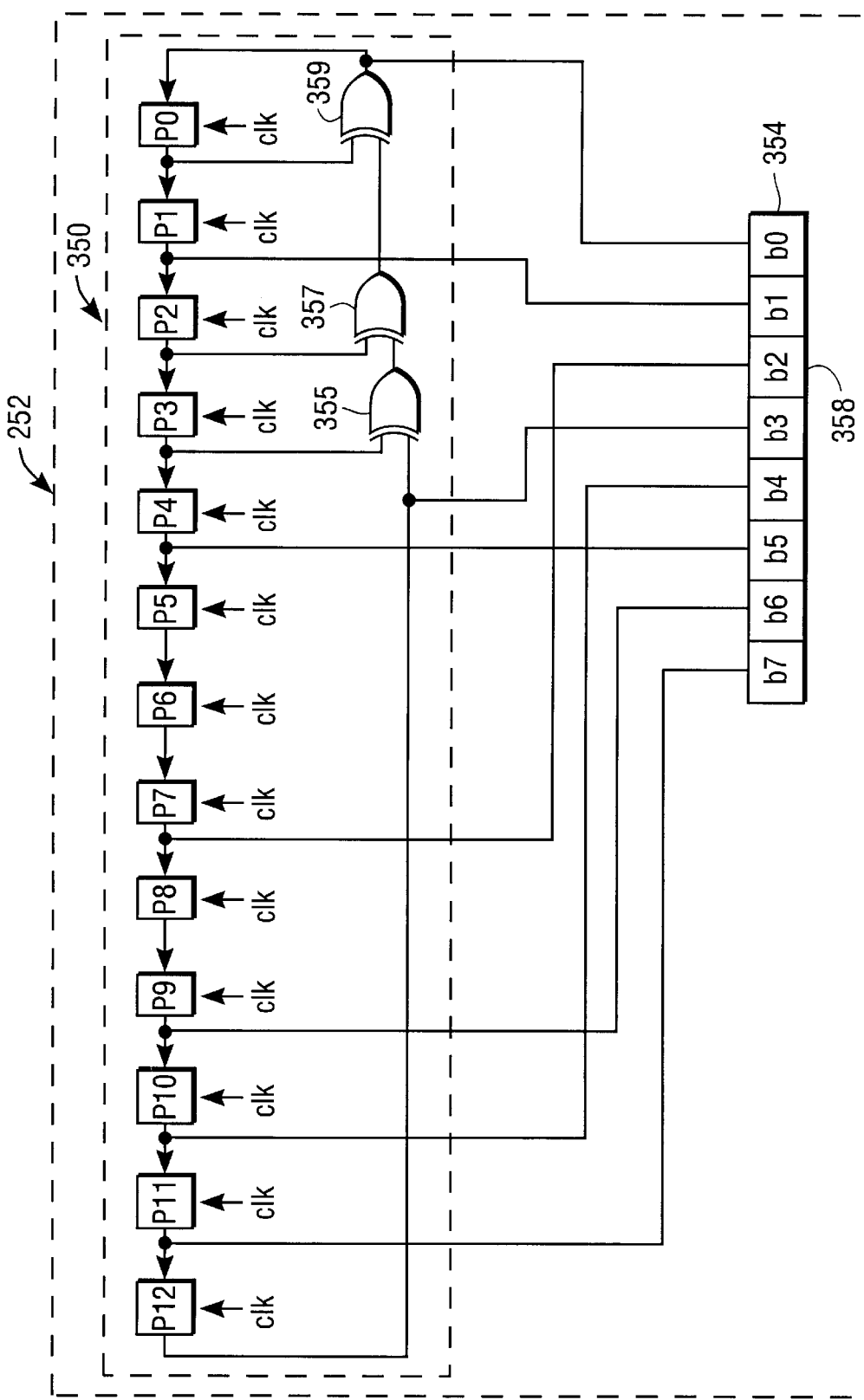
FIG. 3 is a block diagram illustrating a preferred embodiment of psuedorandom generator 252 of FIG. 2.

In a preferred embodiment, the synchronizing signals 201, 202 that are needed to reproduce the picture information on an analog display 164 are produced from synchronization circuits located elsewhere in the graphics controller 108. In one embodiment, the horizontal synchronizing signal 201 is advanced or delayed in accordance with the present invention. This process preferably begins with a pseudorandom generator 252. A preferred psuedorandom generator 252 is illustrated in FIG. 3. A random word is latched into a shift register 350 comprised of storage elements P0-P12 and logic gates 355, 357, 359 by the processor 102. The word is determined by the polynomial $X^{13}+X^4+X^1+X^0$. Eight bits of the word are selected to form the 'delay word' 354. The delay word is then randomized in accordance with FIG. 3. For example, if the delay word was '100101001101,' then the next clock cycle produces the word '00101001100.' The lowest bit of the delay word is randomly generated a result of being the output of the three exclusive-or gates 355, 357, 354. Thus, in the above, example, after the next clock pulse, the first exclusive-OR gate 355 outputs a '0' from the '1''s at its inputs. The second exclusive-OR gate 357 outputs a 1, from the '1' and '0' at its inputs. The third exclusive-OR gate 359 outputs a '0', from the '1's' at its inputs. Thus, '0' is now the lowest bit.

The bits 358 that form the delay word 354 are selected in a non-sequential manner to further randomize the output. For example, in one embodiment P0 is coupled to b0, P2 is coupled to b1, P8 is coupled to b2, P13 is coupled to b3, P11 is coupled to b4, P5 is coupled to b5, P10 is coupled to b6, and P12 is coupled to b7. The pseudorandom capability of the generator 252 are further explained in "Numerical Recipes in C" by William Press, Cambridge University Press (1988). The pseudorandom generator 252 may generate a new pseudorandom number for each line, or it may generate the same number for several lines. This determination is preferably controlled by computer system 100 executing software commands.

Figure 4A:
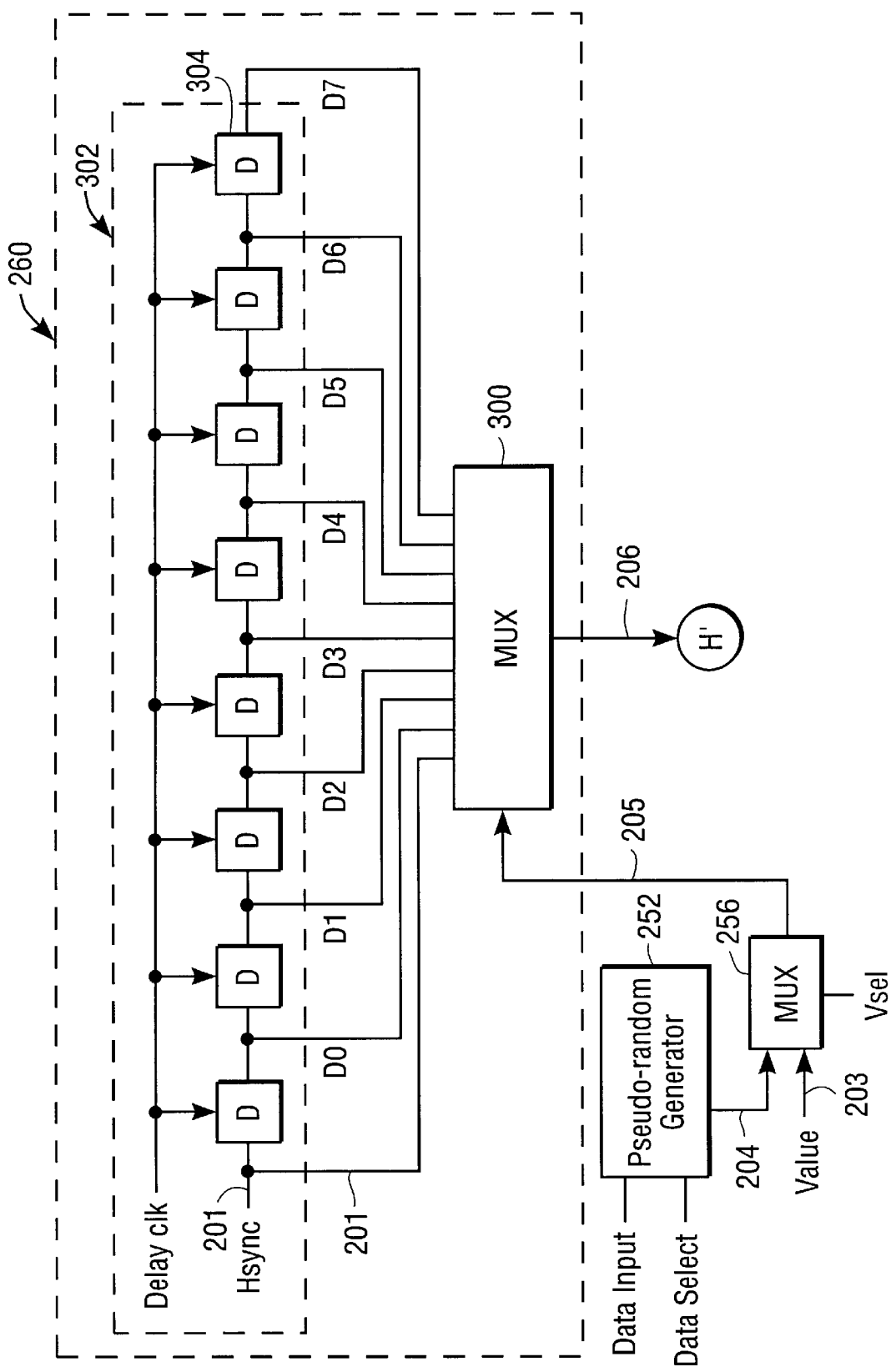
FIG. 4a is a block diagram showing further details of variable delay generator 260 of FIG. 2.

The output 204 of the pseudorandom generator 252 is coupled to an input of a conventional multiplexer 256 as shown in FIG. 4a. The multiplexer 256 selects either the pseudorandom number 204 or a fixed value 203 as the amount of delay for the horizontal synchronizing signal 201. In a preferred embodiment, a fixed value 203 can be a constant stored in a register 248 or can be varied by use of programmable registers. The selection of the multiplexer 256 may also be varied to choose the fixed value 203 or the pseudorandom number 204 at pre-designated intervals. Varying the fixed value 203 provides even more protection against reverse-engineering, as explained below. The output of the multiplexer 256 is coupled to a variable delay generator 260 which receives one of the two values 203, 204 as a delay factor in the form of selection signal 205.

Figure 4B:
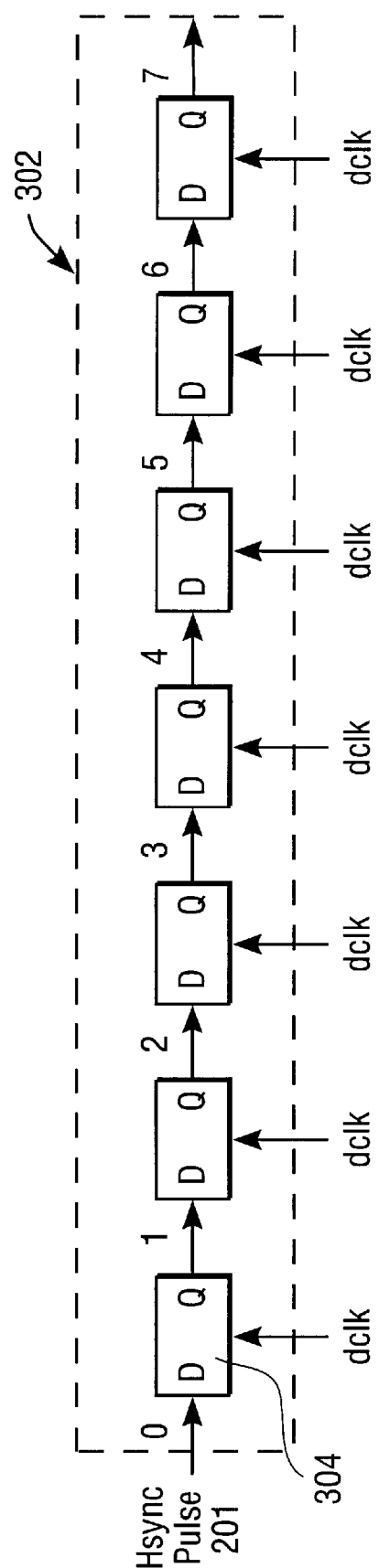
FIG. 4b is a block diagram showing additional details of variable delay generator 260 of FIG. 1.

In a preferred embodiment, as shown in FIG. 4a, the variable delay generator 260 takes the form of a multiplexer 300 which receives multiple outputs of a shift register 302. In one embodiment, the variable delay generator 260 is used to delay the horizontal synchronizing signal 201 although it may be used to delay a vertical synchronizing signal 202 as well. The delay factor 205 transmitted by the multiplexer 256 is coupled to select one of the inputs to the multiplexer 300 to be the delayed horizontal synchronizing signal 206. As shown in FIG. 4a and 4b, the horizontal synchronizing pulse 201 is coupled to shift register 302. As shown more specifically in FIG. 4b, the individual registers or delay elements 304 are also coupled to a delay clock. Thus, as the horizontal synchronizing signal 201 propagates through the shift register 302, the signal 201 is additionally delayed. The output of each register 304 is a different delayed version of the horizontal synchronizing signal 201. Each of these delayed signals, D0–D7, is coupled to the multiplexer 300. The multiplexer 300 selects one of these signals to be the output in response to the selection signal 205. The exact mechanism by which the horizontal synchronizing signal 201 is delayed is not critical and any means of generating multiple signals, delayed at varying intervals, can be used.

Figure 5A:
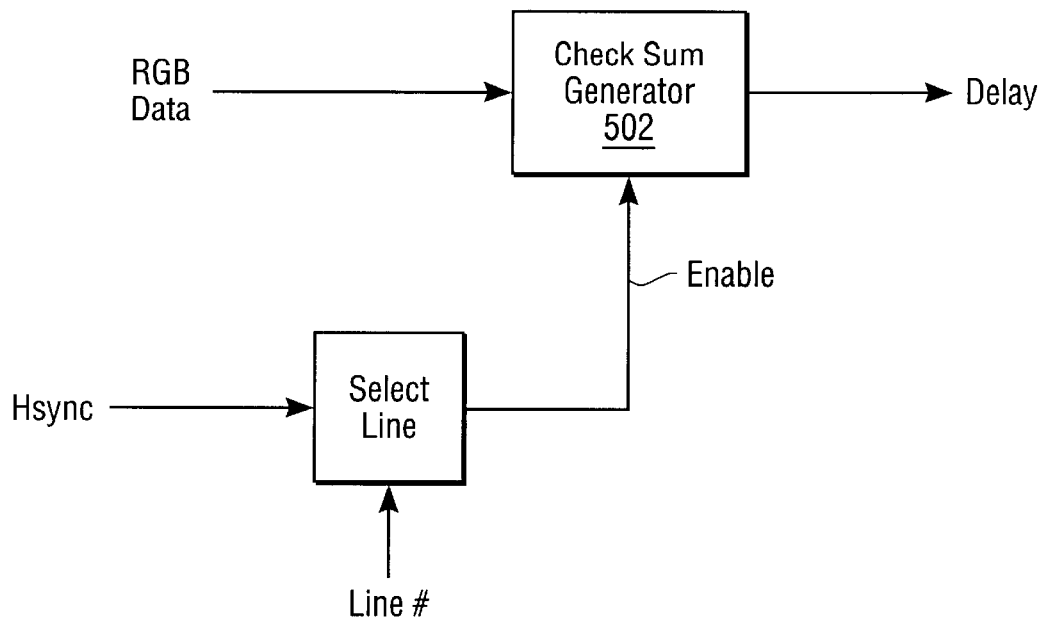
FIG. 5a illustrates an alternate embodiment of variable delay generator 260.
Figure 5B:
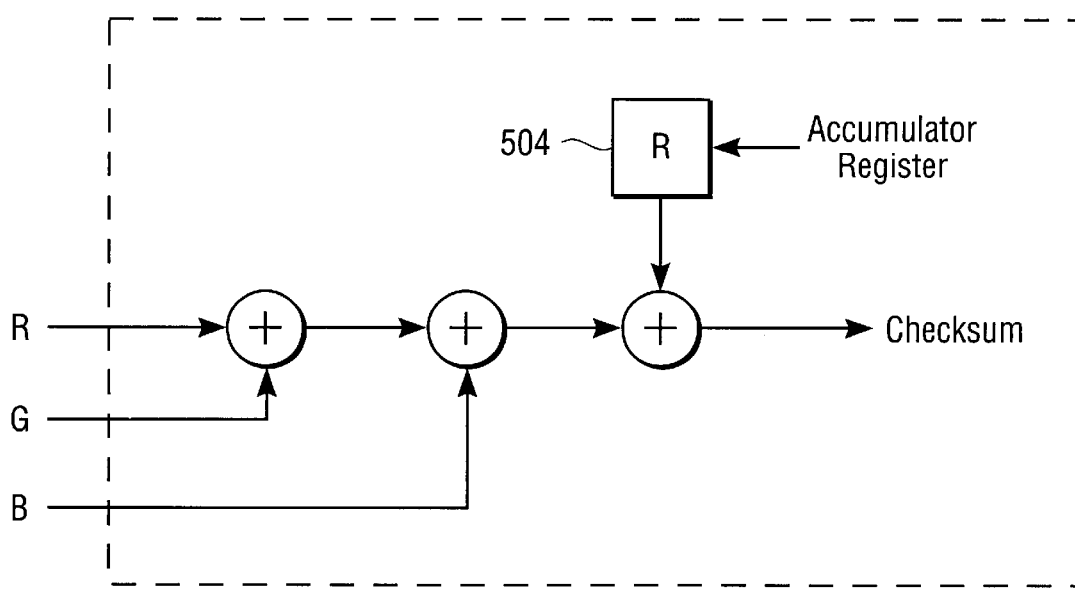

For example, in an alternative embodiment shown in FIG. 5a, the amount of delay is derived from a check sum of the data in one horizontal line, where the horizontal line is arbitrarily chosen each time a delay is needed. The RGB data is transmitted to a check sum generator 502. The other input of the check sum generator 502 is an enable input which enables the check sum generator 502 to receive the RGB data of a selected line. The line selection may be controlled by the use of programmable registers. As further illustrated, in FIG. 5b, the 'R' and 'G' data of a selected line are added together, and the sum is added to the 'B' data. This total sum is output as a delay to be applied to the synchronizing signal 201. The output is also stored in the accumulator register 504 to be added to the next RGB summation. Thus, the output of this circuit is a delay which is a value determined by the RBG values of a selected line plus the addition of previously stored RGB data. As the line's selection is arbitrary, and the RGB summation of a line may be any value, the result is a delay which is random, and therefore hard to predict.

The output of generator 260 is signal 206, which is simply a delayed version of signal 201. The signal 206 is transmitted to the CRT controller 244 which encodes the horizontal 206 and vertical 202 synchronizing signals into computer monitor signals for use with computer monitor 164. The exact form of the CRT controller 244 is not critical and may take one of a variety of conventional forms. The computer monitor signals 245 are then transmitted to the monitor 164.

A downstream device used by someone seeking to illegally copy the RGB signal 268 will most likely be a VHS type recorder 116 coupled to receive and tape the RGB signal 268 through a VGA-to-NTSC or PAL converter 122. VGA-to-NTSC/PAL converters 122 require stable synchronizing signals 201, 202 to produce a stable television signal. As the horizontal synchronizing signal 201 is used to locate the beginning of a line of picture information, when the horizontal synchronizing signal 201 is delayed, the signal received by the VGA-to-NTSC/PAL converter 122 is converted incorrectly by the converter 122, and is therefore reproduced incorrectly by the downstream device 114, 116. A delayed horizontal synchronizing signal 206 does not affect a conventional computer monitor 164 because the monitor 164 is designed to quickly adjust to changes in synchronization signals. Furthermore, the system is designed so that the amount of delay and the frequency of the delay is controllable (unlike typical television and VCR's) and therefore a compromise can always be found where the computer monitor 164 synchronizes correctly, but a television-like device 114, 116 downstream does not.

In accordance with the preferred embodiment, another aspect of delaying the horizontal synchronizing signal 201 is the effect on color reproduction. NTSC signals use a color burst signal which is transmitted directly prior to the line of picture information, and directly after the horizontal sync pulse. A VGA converter 122 takes the color information contained in the RGB signal 268 to create a color burst signal. With a delay, the VGA-to-TV converter 122 has difficulty in generating a subcarrier since the subcarrier burst must be in a precise relationship with the horizontal sync signal 201. The computer monitor 164 will not be affected in color since the RGB signal 268 never generates any such color subcarrier.

Eventually, the VGA converter 122 may resynchronize itself with the delayed horizontal synchronizing signal 206 and begin transmitting the correct picture information. This may take several lines, but the phase-locked loop of the converter 122 will lock onto a periodically delayed horizontal synchronizing signal 206, although there will still be delay selected at the top and bottom of the picture. In accordance with a preferred embodiment of the present invention, the VGA converter 122 is prevented from locking onto the delayed horizontal synchronizing signal 206 by adding a jitter. The jitter is provided by using a pseudorandom number 204 as the amount of delay to be added to the horizontal synchronizing signal 201. As described above, this jitter can change with each frame or line, thereby forcing the downstream device to lock on to a new frequency with each frame or line. Computer monitors 164 are designed to synchronize (sync) to a wide variety of input signals, as evidenced by the myriad of PC graphic models available today. Television displays 114 are designed to be inexpensive and to synchronize only to a well known synchronization standard (NTSC or PAL) and therefore are much less tolerant of variations. Furthermore, VHS recorders 116 are even more susceptible to sync variations so that a picture which is properly displayed on a television 114 may not be recorded properly by the VHS VCR 116. Also, by varying the amount of the delay, different parts of each line are lost, and the resultant screen image appears to be constantly fluctuating.

Another problem inherent in copy protection schemes is limited protection against reverse-engineering. The introduction as described above advantageously makes it more difficult to reverse-engineer embodiments employing the principles of the present invention. A potential reverse-engineering solution would be to determine the amount of delay programmed by a copy protection scheme and then design a converter 122 to adjust to the programmed delay. However, varying the delay by a pseudorandom amount 204 makes it more difficult to determine the amount of delay that is being applied. Additionally, varying the fixed value 203 periodically increases the difficulty of successfully defeating the copy protection mechanism employed by preferred embodiments. This embodiment still may not preclude a copyist from using a system having a better synchronization circuit to design around embodiments of the present invention. However, even if the downstream device is able to synchronized with the delayed or advanced horizontal or vertical synchronous signal, the resulting picture is unstable for short periods of time, thereby creating a "signature" or branding that indicates that the material has been pirated.

In a preferred embodiment, the delayed sync signal 206 is only applied to the horizontal pulses by generator 224, which are preferably located at the top and bottom of overscanned portions of the frame. Thus, even if flickering were to occur in the signal transmitted to the computer monitor 164, the distortion would occur in the portions of the picture not containing video information and therefore would not disturb the viewer. Additionally, by limiting the delay to the top and bottom of the frame, the computer monitor 164 is more easily able to resynchronize itself with the delayed signal. A typical VGA-to-NTSC/PAL converter 122, however, bases its timing on the lines located at the top and bottom portions of the frame. Thus, a delayed synchronizing signal 206 for the top and bottom of the frame produces the same poor quality image as if the horizontal sync signal 201 was delayed for the entire frame.

In the previous discussion, delays are used as an example of how to modify the horizontal sync signal 201 in order to create a distorted picture if converted to NTSC or PAL. However, the sync signal 201 can also be advanced horizontally in pixels, thus causing the horizontal sync pulse to occur too soon, and the same effect is produced. In the a preferred embodiment, the variable delay generator 260 delays and advances the horizontal sync signal 201 randomly, thus making it more difficult for a downstream device 114, 116 to lock onto the sync signal 201. Whether the difference between horizontal synchronizing signal 201 and the delayed version 206 is considered to be advanced or delayed depends on the relationship of the two signals. For instance, the system may be set to operate always with a fixed Hsync delay 203 that lands in the middle of all the delay elements 304 and then the variable delay generator 200 chooses delay elements 304 before and after the normal operation tap in accordance with the random value generator 252 to 'advance' or 'delay' the signal 201.

Although the above discussion has focused on advancing or delaying the horizontal synchronizing signal 201, the vertical synchronizing signal 202 can also be advanced or delayed to great effect. The circuitry for delaying the vertical synchronizing signal 202 is preferably identical to the circuitry shown in FIG. 2 for delaying the horizontal synchronizing signal 201. The only difference is that the vertical synchronizing signal 202 is generated by the vertical timing generator 140 responsive to the Vsync pulse and is coupled to the variable delay generator 260. The delay is now in lines, and not pixels. As described above, a television 114 uses the vertical synchronizing signal 202 to determine when each frame ends. If the vertical sync signal 202 is delayed, then at the top of the image, the picture is shifted up vertically, and information at the top lines are lost, and at the bottom part the vertical blanking interval is seen. The number of lines lost and the amount of vertical blanking seen is dependent on the length of the delay. By randomizing the delay, as described above, the television 114 or recorder 116 has difficulty locking onto the new sync signal, and differing parts of the screen are shifted and appear blank. The degree of randomization in the vertical embodiment needs to be less than the degree used in the horizontal embodiment. Computer monitors 164 are typically more sensitive to vertical sync variations, and therefore a fixed delay 203 can be expected to work effectively.

Pulse Bar Generation

In accordance with a second aspect of the present invention, the number of lines 280 containing video information transmitted to computer monitor 164 is contracted. Preferably, the total number of lines in a frame is kept the same. Then, pulse bars 218 are inserted into the signal 214 to create a signal of poor quality if copied using a VHS recorder 116.

Referring again to FIG. 2, front end of the system 100 includes a frame buffer 104 and a vertical picture contractor 208. The frame buffer 104 is memory used for storing the pixel information formatted in lines received from the video source. Any conventional memory device can be used. The frame buffer 104 provides pixel information in line format to a vertical picture contractor 208 which contracts the vertical size of the picture. Contraction is a process used to make up for the overscanning that occurs in televisions 114. In most commercially available televisions, the actual picture transmitted to the television display is actually larger than the visible picture. On the other hand, computer monitors 164 display the entire image, and in fact the image is typically centered within the borders of the computer monitors 164 so that the user always sees a black area around the image. Thus, an RGB video signal designed for display on a computer monitor 164 has more lines of video information than can be displayed on a standard television 114. Most televisions 114 overscan NTSC signals and crop out portions at the top and bottom of the screen before creating a signal for viewing. Therefore, there are portions at the top and bottom of the signal which are not in the viewable region. In a VGA monitor 164, all lines are used for viewing an RGB signal. For example, a non-interlaced 640×480 data format is common among computer monitors and LCD displays, especially desktop and laptop versions. In this format, each frame of computer graphics is represented as 480 horizontal lines consisting of 640 pixels each. In contrast, the NTSC format has 484 active horizontal lines, only approximately 420 of which are displayed, the actual number displayed varying from one television 114 to another. Thus, if an RGB signal is to be displayed on a television 114, the number of lines containing video information must be reduced, or contracted.

However, by contracting the number of lines, it is preferred that the information contained in the lines to be eliminated is not lost. A preferred method of vertical contraction is described in copending patent application Ser. No. 08/942,143, entitled "System and Method for Simultaneous Flicker-Filtering and Overscan Compensation," filed Sep. 29, 1997, assigned to the assignee of the present application, and hereby incorporated by reference. The system and method described in the aforementioned patent application contracts the number of lines containing video information without losing the information contained by the lines to be eliminated by using vertical overscan compensation. The exact manner in which a picture is vertically contracted is not critical and other methods may also be used. For example, one alternative is to simply drop lines so that the resulting picture contains less lines. This leads to very poor picture quality. Or, a second alternative is to use a normal scaling value as is used by conventional computer graphics 2D engines. After a vertical contraction process is complete, less lines are used to display a compacted image. Thus, there are more lines containing no video information above and below the lines containing the vertically contracted signal. Typically, vertical contraction only takes place for a video signal to be displayed on a television 114, as described above. However, as shown in FIG. 2, in accordance with a preferred embodiment, vertical contraction is performed for the video signal to be displayed on the computer monitor 164 as well.

The vertically contracted signal 212 is next preferably sent to an attenuator 220. In a preferred embodiment, the attenuator 220 attenuates the signal from 10 to 12%. The amplitude of the signal 212 is reduced to enhance the contrast between the signal 212 and the pulses 218 that will be inserted next, to create a signal of poorer and less desirable viewing quality to a potential copyist. Twelve percent is typically the maximum allowable attenuation before the picture appears to change brightness perceptibly on a VGA monitor 164. Therefore, attenuation up to about 10 per cent has little visible effect on the picture's appearance. This is because the display of an image on a Cathode Ray Tube (CRT) type of display is produced by an electron gun that shoots out electrons that excite phosphors embedded on a plate. The more voltage applied to the phosphors, the brighter they appear. However, after a certain point, phosphors absorb less and less voltage. Therefore, if the amplitude is reduced by 10 or 12%, the difference in amount of voltage absorbed by the phosphors at that level is small compared to the amount of voltage absorbed by the phosphors at 100% amplitude. On the monitor 164, the viewer generally does not notice the difference in brightness between a picture at 100% and a picture at 90%. However, if the amplitude is reduced much below 12%, the phosphors absorb a noticeably less amount of voltage, and the image appears to change brightness perceptibly. The gamma response of the computer monitor 164 and the sensitivity of the human eye are such that small variations in the maximum brightness level are less discernible than in the lower ranges of intensity.

Figure 6A:
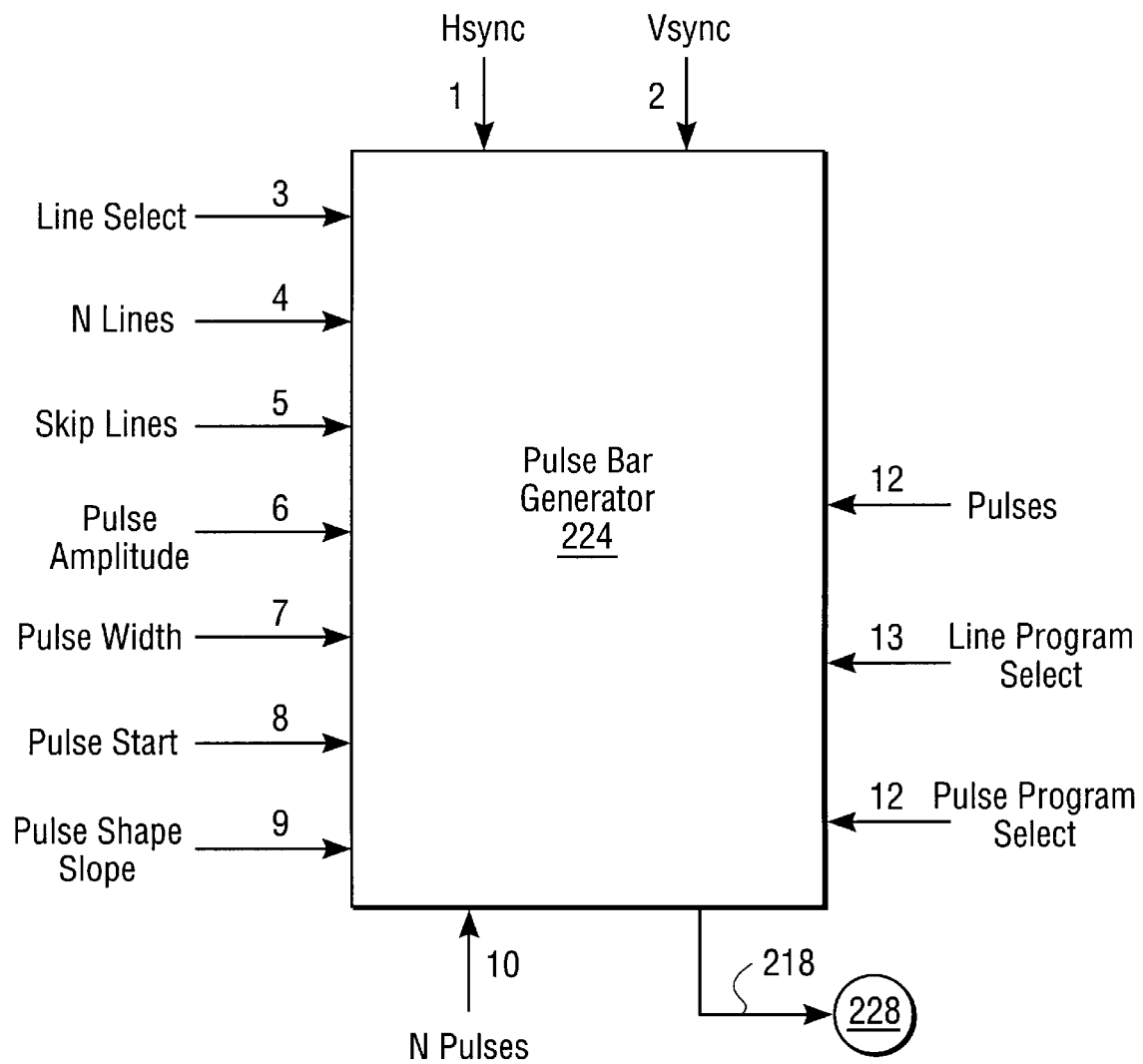
FIG. 6a is a block diagram of a preferred pulse generator in accordance with the present invention.

In a preferred embodiment, two horizontal pulse bars 218 are generated by a horizontal pulse bar generator 224 as illustrated in FIG. 6a. Pulses are created by generating digital values for predetermined periods of time. For example, in an eight-bit system where the amplitude of the pulse bars 218 can range from 0–255, a user may select pulse bars having an amplitude of 128 occurring for 0.1 microsecond as the pulse bars to be used in his embodiment of the present invention. The values are preferably stored into ROM, and then accessed through their addresses. However, a RAM look-up table may also be used. The horizontal timing generator 232 controls which lines are occupied by the pulse bars 218. The number of lines that occupy the horizontal pulse bars is preferably selected according to the vertical contraction. For instance, if the picture is reduced by only 20 lines at the top and 20 lines at the bottom (i.e. original 480 lines resized to 440 lines), then only the first 10 top and bottom lines are chosen by the horizontal timing generator 232 to have pulses.

Preferably, the number, location, and identity of the lines where the pulses 218 are generated are set by the use of programmable registers. Additionally, by the use of programmable registers, each pulse 201 may have a different duration, position, color, slope and amplitude. The Pulse Program Select (12) input chooses which pulse is being programmed at the time. For instance, FIG. 6b shows that the pulses start at line 3 and last until line 9 (N Lines=7). In FIG. 6c two lines are skipped after each set of pulses, and the entire pulse lasts for 7 lines. In FIG. 6d the pulses last for 404 lines, but there is a skip of 392 lines after the first set of lines. In FIG. 6e, an example of the pulses that can be generated every line is illustrated. The Pulse Program Select input chooses which pulse is being programmed at the time. For instance, to program the pulses in FIG. 6e in a configuration like the one in FIG. 6d, the values of the registers would be:

Line Select=3
N Lines=7
Skip Lines=392
N Pulses=3
For Line Program Select=1 to 7 (since N Lines=7)

For Pulse Prog Select=1 to 3 (since N Pulses=3)
Pulse Amplitude=value from software table
Pulse Width=value from software table
Pulse Start=value from software table
Pulse Shape=value from software table
end The various software tables referred above preferably reside in the processor memory and are set according to the particular specification of the signal. For example, values stored in the software table for the amplitudes of the three pulses depicted in FIG. 6e would be: 50, 10, 75 (for the percentage amplitude of each pulse).

The pulse shape values range from 1 to 32 and indicate how many steps it takes to reach the maximum amplitude, where each step is one sample duration. For instance, if the value of a pulse shape is 4, it takes four steps to reach 100% amplitude, each step being 25. Similarly, if the pulse shape value is 32, is takes 33 steps (due to rounding) to get to 100% amplitude. The exact ramp value is not important. What is important is that the shape or slope of the pulse during increase and decrease can be changed. Varying the pulse shape offers additional protection against reverse-engineering. If a copyist compensates for a rectangular pulse, the system in accordance with the present invention varies the shape of the pulse to force the copyist to compensate again. As discussed above, such variations drive up the difficulty of copying, but do not make it impossible.

The pulse bars 218 preferably are generated at an amplitude higher than the maximum picture amplitude of the attenuated RGB signal 214. In a preferred embodiment, the amplitude of the pulse bars 201 is set to 100% to enhance the contrast between the pulse bars 201 and the signal 214. However, to be effective in fooling the VCR, the pulse amplitude is varied in time by the software. The software can set the amplitude variations every second and change the amplitude from low to high or high to low in a monotonically changing manner. For instance, the software may choose to decrease the amplitude by 5% every second until the amplitude is half and then increase is by 15% until the amplitude is the maximum allowed. The possibilities are endless and it does not have to be in a linear increase or decrease in amplitude. As long as it is known what the attenuation of the signal is set for, the amplitude can be generated at any amplitude, as long as it is greater than the maximum amplitude of the attenuated RGB signal 214. The contrast between the amplitude of the pulse bars 218 and the video information tends to produce an image which is undesirable to most viewers of the copied signal.

The pulse bars 218 are preferably added to the attenuated RGB signal 214 by an adder 228. The adder 228 preferably takes a conventional form. The output 220 of the adder 228 is coupled to the input of a digital to analog converter 236, which converts the digitally encoded RGB signal into an analog RGB signal 268, suitable for transmission to a computer monitor 164. The digital-to-analog converter 236 preferably takes a conventional form employing separate eight-bit converters for each color (RGB). When transmitted to the VGA monitor 164, the pulses will appear as fixed white vertical slits, located at the top and bottom of the screen. However, the color of the pulse bars 218 is selectable, and may be displayed at any suitable color for the user's display 164. The pulses, of course, are not displayed on the television as since the pulses are overscanned for the TV display.

If a VGA to NTSC converter 122 is coupled to receive the RGB signal 268, the effect of having pulses at 100% and an attenuated signal at 90% is to fool the automatic gain control (AGC) of a typical VHS recorder. The automatic gain control of the VHS recorder typically detects the maximum picture amplitude of the NTSC signal and adjusts the gain higher or lower accordingly. When the AGC detects the pulses at 100%, it lowers the amount of gain it adds to the signal. Since the actual signal is 10% lower in strength, and does not receive any additional gain, the resultant picture appears dim. This advantageously produces a video signal of very poor image quality that is virtually unusable for copying on a VHS type recorder 116, but still can be accurately displayed on a computer monitor 164.

The programmable registers of the present invention coupled to the variable delay generator 260, the multiplexer 256, and the pulse bar generator 224, provide a great amount of flexibility and variety in the type of copy protection offered by the system. As discussed above, the delay may be selected to be a fixed delay 203 or a random delay 204, the delay may be changed for every line or every few lines, the number of pulse bars 218 generated for each line may be selected, as well as their shape and amplitude. A preferred configuration in accordance with the present invention has the first ten lines and the last ten lines of the picture include pulse bars 218. Seven pulse bars 218 are selected for each line. Each pulse bar 218 is selected to be 3.5 microseconds wide, and separated from each other by 3 microseconds. Even lines are enabled to start with a pulse bar 218 of 3.5 microseconds, and odd lines start with a blank of 3 microseconds. The maximum amplitude of the pulse bars 218 is changed every second. The delay factor 205 is selected as random with a maximum delay of 32 pixels. The lines affected by the delay 201 are selected to be different than the ones having the pulses 218. The pulses 218 are set to a color of blue. The copy protection is enabled only when a DVD movie is playing in full screen mode (which is typically the embodiment used by potential copyist). Thus, the integration of the delay and the pulse bars 218 provides an effective protection against illegal copying of the video signal output from the computer monitor port of a computer system 100. It is to be understood that the specific mechanisms and techniques, discussed herein are merely illustrative of exemplary applications of the principles of the invention. Numerous modifications may be made to the methods and apparatus described without departing from the true spirit and scope of the invention.

What is claimed is:

1. An apparatus for modifying a graphics data signal to produce a video signal of poor quality if recorded by a VHS-type recorder but which can still be accurately displayed on a computer monitor, comprising:

a vertical picture contractor, having an input coupled to the graphics data signal, for contracting the graphics data signal in vertical size to produce a contracted signal;

an attenuator, coupled to an output of the vertical picture contractor, for attenuating the amplitude of the contacted signal;

a horizontal timing generator for selecting locations for pulse bars to be inserted into the contracted signal such that the pulse bars will not interfere with a display of the graphics data signal on a computer monitor;

a pulse bar generator, coupled to the horizontal timing generator, for generating horizontal pulse bars at a location determined by the horizontal timing generator and an amplitude greater than a maximum picture amplitude of the attenuated signal sufficient to distort the graphics data signal if viewed on a non-computer monitor device; and an adder, coupled to the output of the attenuator and the output of the pulse bar generator, for adding the horizontal pulse bars to the attenuated signal to create said video signal of poor quality.

2. The apparatus of claim 1, wherein the attenuator reduces the data signal by approximately 10%.

3. The apparatus of claim 1, wherein the attenuator reduces the data signal by an amount between approximately 10% and approximately 12% and wherein the amount is randomly determined.

4. The apparatus of claim 1, wherein the pulse bars are generated at approximately 100% amplitude.

5. The apparatus of claim 1, wherein the vertical picture contracter is a vertical overscan compensator.

6. The apparatus of claim 1, wherein the graphics data signal is an RGB signal.

7. The apparatus of claim 1, further comprising a digital to analog converter, for converting the added signal to an analog signal for display on the computer monitor.

8. The apparatus of claim 1, wherein the vertical picture contracter, the horizontal timing generator, the attenuator, the pulse bar generator, and the adder are located on a single device.

9. The apparatus of claim 1 wherein the lines to be affected by the pulse bar are varied by the horizontal timing generator.

10. The apparatus of claim 1, wherein the amplitude and width of the pulse are selectable.

11. The apparatus of claim 1 wherein the shape of the pulse is selectable.

12. The apparatus of claim 1 wherein the pulse generator generates a plurality of pulses, and the number of pulses generated is selectable.

13. An apparatus for modifying graphics data signals to be displayed on a display device wherein said signals are displayed in accordance with horizontal synchronizing signals, said graphics data signal having a maximum picture amplitude to produce a signal that causes a distorted image if used with VHS-type recorders comprising:

a pseudorandom generator for generating a pseudorandom number;

a fixed value generator for generating a fixed value;

a multiplexer coupled to the pseudorandom generator and the fixed value generator for selecting the pseudorandom number or the fixed value for use as a delay factor in transmission of said graphics data signal;

a variable delay generator coupled to a horizontal synchronizing signal and the multiplexer for generating a delayed horizontal synchronizing signal in accordance with the delay factor;

an attenuator coupled to the graphics data signal for attenuating the amplitude of the signal;

a pulse bar generator for generating horizontal pulse bars whose amplitude is a value greater than the maximum picture amplitude of the attenuated signal and sufficient to distort the graphics data signal if viewed on a non-computer monitor device; and an adder coupled to the attenuator and the pulse bar generator for adding the horizontal pulse bars to the attenuated signal.

14. The apparatus of claim 13 wherein a vertical synchronizing signal is modified and the variable delay generator generates a delayed vertical synchronizing signal in accordance with the delay factor.

15. The apparatus of claim 13 further comprising a vertical line selector, coupled to the pseudorandom generator and the multiplexer for enabling the variable delay generator and the multiplexer only for the lines selected by the vertical line selector.

16. The apparatus of claim 15, wherein the vertical line selector selects lines located at the top and bottom of the display.

17. The apparatus of claim 13 wherein the variable delay generator is a multiplexer coupled to a shift register, and the shift register generates a plurality of delayed horizontal synchronizing signals and the multiplexer selects one of the plurality based upon the delay factor.

18. The apparatus of claim 13 further comprising a CRT controller wherein the delayed horizontal synchronizing signal and a vertical synchronizing signal are converted to analog signals usable by a computer monitor.

19. The apparatus of claim 13 wherein the fixed value is varied.

20. A method for adding copy protection to a signal containing data represented in lines, comprising the step of:
- modifying the signal so that the signal uses fewer lines while retaining all information of the signal;
- attenuating the amplitude of the modified signal;
- generating horizontal pulse bars to occupy the empty lines created by modifying the signal, wherein the horizontal pulse bars have an amplitude attenuated amplitude of the signal and sufficient to distort graphics data signal if viewed on a non-computer monitor; and
- combining the pulse bars and the attenuated signal to create a signal with copy protection.

* * * * *